US012678952B2

(12) United States Patent
Willför et al.

(10) Patent No.: US 12,678,952 B2
(45) Date of Patent: Jul. 14, 2026

(54) METHOD OF PROGRAMMING MANIPULATOR, CONTROL SYSTEM AND INDUSTRIAL ROBOT

(71) Applicant: ABB Schweiz AG, Baden (CH)

(72) Inventors: Per Willför, Västerås (SE); Roger Kulläng, Västerås (SE); Anders Ekelund, Gothenburg (SE)

(73) Assignee: ABB Schweiz AG, Baden (CH)

( * ) Notice: Subject to any disclaimer, the term of this patent is extended or adjusted under 35 U.S.C. 154(b) by 81 days.

(21) Appl. No.: 18/556,962

(22) PCT Filed: Apr. 29, 2021

(86) PCT No.: PCT/EP2021/061267
§ 371 (c)(1),
(2) Date: Oct. 24, 2023

(87) PCT Pub. No.: WO2022/228681
PCT Pub. Date: Nov. 3, 2022

(65) Prior Publication Data
US 2024/0293932 A1     Sep. 5, 2024

(51) Int. Cl.
B25J 9/16         (2006.01)
B25J 9/00         (2006.01)
(52) U.S. Cl.
CPC ........... B25J 9/1664 (2013.01); B25J 9/0081 (2013.01); B25J 9/161 (2013.01)
(58) Field of Classification Search
CPC ........ B25J 9/1664; B25J 9/0081; B25J 9/161; B25J 9/1656; G05B 19/0426; G05B 19/423; G05B 19/40386
See application file for complete search history.

(56) References Cited

U.S. PATENT DOCUMENTS

| | | | |
|---|---|---|---|
| 5,980,082 A | 11/1999 | Watanabe et al. | |
| 2004/0093119 A1* | 5/2004 | Gunnarsson | ........... B25J 9/1638 700/245 |

(Continued)

FOREIGN PATENT DOCUMENTS

| | | |
|---|---|---|
| CN | 101623867 A | 1/2010 |
| CN | 104684695 A | 6/2015 |

(Continued)

OTHER PUBLICATIONS

International Search Report and Written Opinion of the International Searching Authority; Appplication No. PCT/EP2021/061267; Completed: Janusry 11, 2022; Mailing Date: Jan. 19, 2022; 18 Pages.

(Continued)

*Primary Examiner* — Dalena Tran
(74) *Attorney, Agent, or Firm* — Whitmyer IP Group LLC

(57) ABSTRACT

A method of programming a manipulator, the method including providing a movement path for execution by the manipulator, the movement path having a plurality of points including a start point and an end point and at least one movement segment between the plurality of points; moving the manipulator to a path modifying position; and modifying the movement path from the start point to the end point based on the path modifying position upon receiving a modification input from a user. A control system for programming a manipulator, and an industrial robot including the manipulator and a control system, are also provided.

17 Claims, 12 Drawing Sheets

(56)        References Cited

U.S. PATENT DOCUMENTS

| | | | |
|---|---|---|---|
| 2004/0133309 A1* | 7/2004 | Huttenhofer ....... | G05B 19/4103 |
| | | | 700/245 |
| 2004/0254677 A1* | 12/2004 | Brogardh ............. | G05B 19/425 |
| | | | 700/250 |
| 2005/0107921 A1 | 5/2005 | Watanabe et al. | |
| 2009/0299526 A1 | 12/2009 | Ditscher et al. | |
| 2011/0224815 A1* | 9/2011 | Sonner ................... | B25J 9/1664 |
| | | | 700/97 |
| 2015/0239123 A1 | 8/2015 | Hagenauer et al. | |
| 2016/0263744 A1 | 9/2016 | Dzierzega et al. | |
| 2018/0154518 A1 | 6/2018 | Rossano et al. | |
| 2018/0345495 A1 | 12/2018 | Aldridge et al. | |
| 2020/0009730 A1 | 1/2020 | Henriksson et al. | |
| 2020/0387150 A1 | 12/2020 | Aldridge et al. | |

FOREIGN PATENT DOCUMENTS

| | | | |
|---|---|---|---|
| CN | 111152214 A | 5/2020 | |
| EP | 780197 B1 | 2/1999 | |
| EP | 3369534 A1 | 9/2018 | |

OTHER PUBLICATIONS

International Preliminary Report on Patentability; Application No. PCT/EP2021/061267; Issued: Oct. 24, 2023; 12 Pages.

Chinease Office Action; Application No. 2021800972891; Mailed Jan. 17, 2026; 14 Pages.

* cited by examiner

METHOD OF PROGRAMMING MANIPULATOR, CONTROL SYSTEM AND INDUSTRIAL ROBOT

TECHNICAL FIELD

The present disclosure generally relates to programming of a robotic manipulator. In particular, a method of programming a manipulator, a control system for programming a manipulator, and an industrial robot comprising a manipulator and a control system, are provided.

BACKGROUND

Manipulators of industrial robots can often be programmed by means of lead-through programming. With lead-through programming, a human can physically lead the manipulator to specific target points and record joint angles of the manipulator in each point using a programming device, such as a teach pendant unit, TPU. A movement path comprising a plurality of movement segments between the points can then be generated (e.g. by interpolation) to provide a robot program. Positioning of the manipulator by means of lead-through is often easier for the user in comparison with jogging the manipulator to different points by means of a joystick or similar.

During conventional lead-through programming, the points are added in the same order as they will be executed by the manipulator. That is, each new point is added at the end of the movement path. The user does therefore not have to think about where in the robot program the new point will be added. Such programming by means of lead-through is therefore relatively straightforward.

However, it is not certain that the user always wants to add a new point at the end of the movement path. Modifications of movement paths, such as modifying, adding or deleting an intermediate point, are often troublesome with conventional programming. If a point is to be added in the middle of the movement path, the user may have to find the relevant movement segment in the robot program in the TPU, move a cursor to the relevant movement segment and add new instructions. Furthermore, if a programmed point should be modified, the programmed point needs to be found in the robot program in the TPU before modifying it. These operations are particularly difficult in block programming where there is no visible pointer for selecting a block. Furthermore, in both these examples, the user has to switch attention between the moving manipulator and the TPU to ensure that the robot program is correctly created. This is a rather slow and cumbersome process, especially when a large number of programmed points needs to be modified, added and/or deleted.

US 2020009730 A1 discloses an industrial robot having a manipulator and a robot controller configured to control the motions of the manipulator. The robot controller is configured during lead-through programming of the robot to compare a robot position or a robot orientation with at least one virtual position or virtual orientation defined in space, and to actively control the motions of the robot in relation to the at least one virtual position or virtual orientation when the difference between the robot position or robot orientation and the least one virtual position or virtual orientation is smaller than an offset value.

SUMMARY

One object of the present disclosure is to provide an improved method of programming a manipulator.

A further object of the present disclosure is to provide a method of programming a manipulator, which method enables a less complicated modification of a movement path.

A further object of the present disclosure is to provide a method of programming a manipulator, which method is user friendly.

A further object of the present disclosure is to provide a method of programming a manipulator, which method enables using a less complicated user interface.

A still further object of the present disclosure is to provide a method of programming a manipulator, which method solves several or all of the foregoing objects in combination.

A still further object of the present disclosure is to provide a control system for programming a manipulator, which control system solves one, several or all of the foregoing objects.

A still further object of the present disclosure is to provide an industrial robot comprising a manipulator and a control system, which industrial robot solves one, several or all of the foregoing objects.

According to a first aspect, there is provided a method of programming a manipulator, the method comprising providing a movement path for execution by the manipulator, the movement path comprising a plurality of points including a start point and an end point and at least one movement segment between the plurality of points; moving the manipulator to a path modifying position; and modifying the movement path from the start point to the end point based on the path modifying position upon receiving a modification input from a user.

By modifying the movement path based on the path modifying position of the manipulator, the method uses the actual position of the physical manipulator as an input for modifying an already existing movement path. By using the path modifying position as a basis for modification of the movement path, the method provides a new level of interaction between the user and the manipulator.

Furthermore, since the actual position of the physical manipulator is used as an input for the modification of the movement path, the method enables a very simple user interface. In some variants using lead-through movement of the manipulator, only a single input element, such as a physical button or a virtual button, is needed to accomplish modification of the movement path.

The method may further comprise executing the modified movement path by the manipulator. Alternatively, or in addition, the method may further comprise continuously or repeatedly reading the positions of the manipulator while the manipulator is moved.

Each movement segment of the movement path may interconnect two adjacent points. With movement path is meant a geometrical shape of movement in space. A movement trajectory in contrast may contain a particular speed profile and a particular acceleration profile along such movement path. The movement path may be two-dimensional or three-dimensional. The path modifying position may be either on the movement path or outside the movement path.

The manipulator may comprise a tool center point, TCP. In this case, the movement of the manipulator to the path modifying position may comprise moving the TCP to the path modifying position. The path modifying position may comprise both a position and an orientation of the TCP. Each point may define a position of the TCP (e.g. a Cartesian position) and optionally also an orientation of the TCP in the point.

A wide range of modification inputs from the user are possible. Some examples include a physical button, a virtual button, a voice command and a gesture.

The manipulator is a robotic manipulator of an industrial robot. The industrial robot may be a collaborative robot. The collaborative robot may be a truly collaborative robot. i.e. a collaborative robot that is constructed to not be capable of injuring humans. The truly collaborative robot may have a mass of 100 kg or less. Alternatively, or in addition, the truly collaborative robot may comprise one or more arms driven at a power that is less than 80 W. A truly collaborative robot differs from an originally non-collaborative industrial robot that is retrofitted with sensors to be made collaborative. One example of a truly collaborative robot is the YuMi® by ABB.

The manipulator may be programmable in three or more axes, such as in six or seven axes. Throughout the present disclosure, the manipulator may be a robotic arm.

The method according to the first aspect may use a control system according to the second aspect and/or an industrial robot according to the third aspect.

The modification of the movement path may comprise modifying one of the points, deleting one of the points or adding a further point. The path modifying position to which the manipulator has been moved can thus indicate to where a point should be moved, which point should be deleted or where a further point should be added.

The modification or deletion of the point may comprise moving the manipulator to a point selection region among a plurality of point selection regions, each point selection region being associated with a unique point among the plurality of points; selecting the point associated with the point selection region to which the manipulator has been moved as the point for modification or deletion; and modifying or deleting the selected point based on the path modifying position.

In this way, the actual position of the physical manipulator can be used as a selection tool for selecting a point of the movement path. This solution stands in contrast to prior art solutions where the user has to initially look at the robot program in a programming device. In this variant of the method, the actual position of the physical manipulator is used to select where in the robot program a modification should be made. Furthermore, the use of point selection regions enables points to be more easily selected by means of the manipulator. That is, the manipulator does not have to be positioned exactly in the points to be selected.

Each point selection region may be a three-dimensional volume surrounding an associated point, such as a sphere. The point may be centered inside the three-dimensional volume. In the case of spheres, each point selection region may represent a threshold distance between the TCP and the associated point.

The method according to this variant may comprise moving the TCP to the point selection region. In this case, the method may further comprise continuously or repeatedly checking if the TCP is within any of the point selection regions.

The method may further comprise providing feedback to the user indicative of the manipulator being in one of the point selection regions. The feedback may be provided in case the TCP is inside one of the point selection regions.

The addition of the further point may comprise moving the manipulator to a movement segment selection region among at least one movement segment selection region, each movement segment selection region being associated with a unique movement segment among the at least one movement segment; selecting the movement segment associated with the movement segment selection region to which the manipulator has been moved as a movement segment for modification; and adding the further point in association with the selected movement segment based on the path modifying position.

In this way, the actual position of the physical manipulator can be used as a selection tool for selecting a movement segment of the movement path adjacent to which a point should be added. The use of at least one movement segment selection region enables a movement segment to be more easily selected by means of the manipulator. That is, the manipulator does not have to be positioned exactly on the movement segment to be selected in order to add a point associated with the movement segment.

Each movement segment selection region may be a three-dimensional volume surrounding an associated movement segment, such as a cylindrical volume. The movement segment may be centered inside the three-dimensional volume. In the case of cylindrical volumes, each movement segment selection region may represent a threshold distance between the TCP and the associated movement segment.

The method according to this variant may comprise moving the TCP to the movement segment selection region. In this case, the method may further comprise continuously or repeatedly checking if the TCP is within any of the at least one movement segment selection region.

The point selection regions and the at least one movement segment selection region may be mutually exclusive. That is, each position reachable by the manipulator may be assigned to either a point selection region or a movement segment selection region, but not both. Not all reachable positions of the manipulator need to be assigned to a point selection region or a movement segment selection region. In some variants, the point selection regions and the at least one movement segment selection region may together define a continuous volume that only covers part of the positions reachable by the manipulator.

The method may further comprise providing feedback to the user indicative of the manipulator being in one of the at least one movement segment selection region. The feedback may be provided in case the TCP is inside one of the at least one movement segment selection region.

The selection of the point associated with the point selection region or the selection of the movement segment associated with the movement segment selection region may be made based on a selection input from the user.

The selection of the point may comprise receiving the selection input from the user when the manipulator is in the point selection region. The selection input and the modification input for modifying or deleting a point may be provided by a common input element or by different input elements. In case a common input element is used, the modification input may be an input of a first type to the input element (such as a push and hold operation or a single tap) in order to modify the point, and the selection input may be an input of a second type, different from the first type, to the input element (such as a release or a double tap) in order to delete the point. As an alternative, a first input element may be used to provide the selection input and the modification input for modifying a point, and a second input element may be used to provide the selection input and the modification input for deleting a point. Both the first input element and the second input element may be a button and/or may be provided on the manipulator.

In case the selected point is modified, the position of the manipulator when providing the selection input may be different from the position of the manipulator when providing the modification input. The position of the manipulator when providing the modification input, i.e. the position of the modified point, may be either inside or outside the point selection region.

In case the selected point is deleted, the position of the manipulator when providing the selection input may be the same as the position of the manipulator when providing the modification input. In any case, the position of the manipulator when providing the modification input for deleting the selected point may be inside the point selection region.

The selection of the movement segment may comprise receiving the selection input from the user when the manipulator is in the point selection region. The selection input for selecting the movement segment may be identic to a selection input for selecting a point. When the manipulator is positioned in a movement segment selection region and the selection input is received, the method enters a point addition mode. When the manipulator is positioned in a point selection region and the selection input is received, the method enters a point modification mode or a point deletion mode.

When adding the further point, the position of the manipulator when providing the selection input may be different from the position of the manipulator when providing the modification input. The position of the manipulator when providing the modification input, i.e. the position of the added point, may be either inside or outside the movement segment selection region.

If the point selection regions and the at least one movement segment selection region are mutually exclusive, it may thus be concluded that a point should be modified or deleted when the manipulator is in a point selection region when receiving the selection input. Conversely, it may be concluded that a point should be added when the manipulator is not in a point selection region when receiving the selection input.

The feedback may comprise a force feedback in the manipulator. The force feedback may for example be a haptic feedback. For example, different vibrational patterns of the manipulator may be issued in dependence of the various positional relationships between the manipulator and the movement path, such as when the manipulator enters one of the point selection regions, exits one of the point selection regions, enters one of the movement segment selection regions, and/or exiting one of the movement segment selection regions.

Alternative types of feedback include a visual feedback and an audible feedback. For example, a light of a first color may be issued when the manipulator is in a point selection region and a light of a second color, different from the first color, may be issued when the manipulator is in a movement segment selection region. In this case, one or more light emitters may be provided on the manipulator.

The method may further comprise moving the manipulator to a modification type selection position; and selecting at least one path modification type, among a plurality of path modification types, for modification of the movement path based on the modification type selection position. That is, a decision regarding whether to modify, delete or add a point can at least partly be based on the modification type selection position, e.g. when receiving a selection input from the user. Examples of modification type selection positions are positions of the manipulator inside the point selection regions and the at least one movement segment selection region. Positioning of the manipulator in one of the point selection regions can trigger the point modification mode and/or the point deletion mode. Positioning of the manipulator in one of the at least one movement segment selection region can trigger the point addition mode. The method according to this variant may comprise moving the TCP to the modification type selection position.

The movement of the manipulator may comprise moving the manipulator by means of lead-through. The method according to this variant greatly facilitates modification of an existing movement path. For example, the user may only interact with the manipulator (and not a programming device or other manipulation device) in order to modify the movement path.

As an alternative to movement by means of lead-through, the manipulator may be moved by means of a programming device, such as by movement of a joystick thereon.

The method may further comprise providing force feedback towards the movement path during movement of the manipulator. The force of the force feedback may increase with increasing distance between the TCP and the movement path. In this way, a lane assist is provided for the user when moving the manipulator along the movement path by means of lead-through. The method according to this variant may comprise forcing the TCP towards the movement path during movement of the TCP.

According to a second aspect, there is provided a control system for programming a manipulator, the control system comprising at least one data processing device and at least one memory having at least one computer program stored thereon, the at least one computer program comprising program code which, when executed by the at least one data processing device, causes the at least one data processing device to perform the steps of providing a movement path for execution by the manipulator, the movement path comprising a plurality of points including a start point and an end point and at least one movement segment between the plurality of points; continuously or repeatedly determining a path modifying position based on a current position of the manipulator; and modifying the movement path from the start point to the end point based on the path modifying position upon receiving a modification input from a user.

The at least one computer program may further comprise program code which, when executed by the at least one data processing device, causes the at least one data processing device to perform, or command performance of, the steps of the method according to the first aspect.

According to a third aspect, there is provided an industrial robot comprising the manipulator and a control system according to the second aspect. The industrial robot may comprise a manipulator of any type as described in connection with the first aspect.

The industrial robot may further comprise an input element on the manipulator for providing the modification input. The input element may also be used for providing the selection input. The input element may for example be a button.

The selection inputs and the modification inputs can be provided in various ways. The selection input can be provided by pressing the button and the modification input can be provided by releasing the button. Alternatively, the selection input can be provided by pressing the button a first time and the modification input can be provided by pressing the button a second time. A selection input for modification may be a single press of the button and a selection input for deletion may be a double press of the button.

The industrial robot may further comprise a programming device. The programming device may be configured to display information associated with the movement path. The programming device may be configured to display a graphical representation of the movement path or other data (such as text) representing the movement path.

In case the programming device is configured to display a graphical representation of the movement path, the programming device may further be configured to display the current position of the manipulator in relation to the movement path. The programming device may further be configured to display the point selection regions and/or the at least one movement segment selection region in association with the movement path.

The programming device may be a teach pendant unit, TPU. Alternative examples of programming devices according to the present disclosure comprise a mobile phone, a laptop, a stationary computer, a virtual reality (VR) device and an augmented reality (AR) device.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
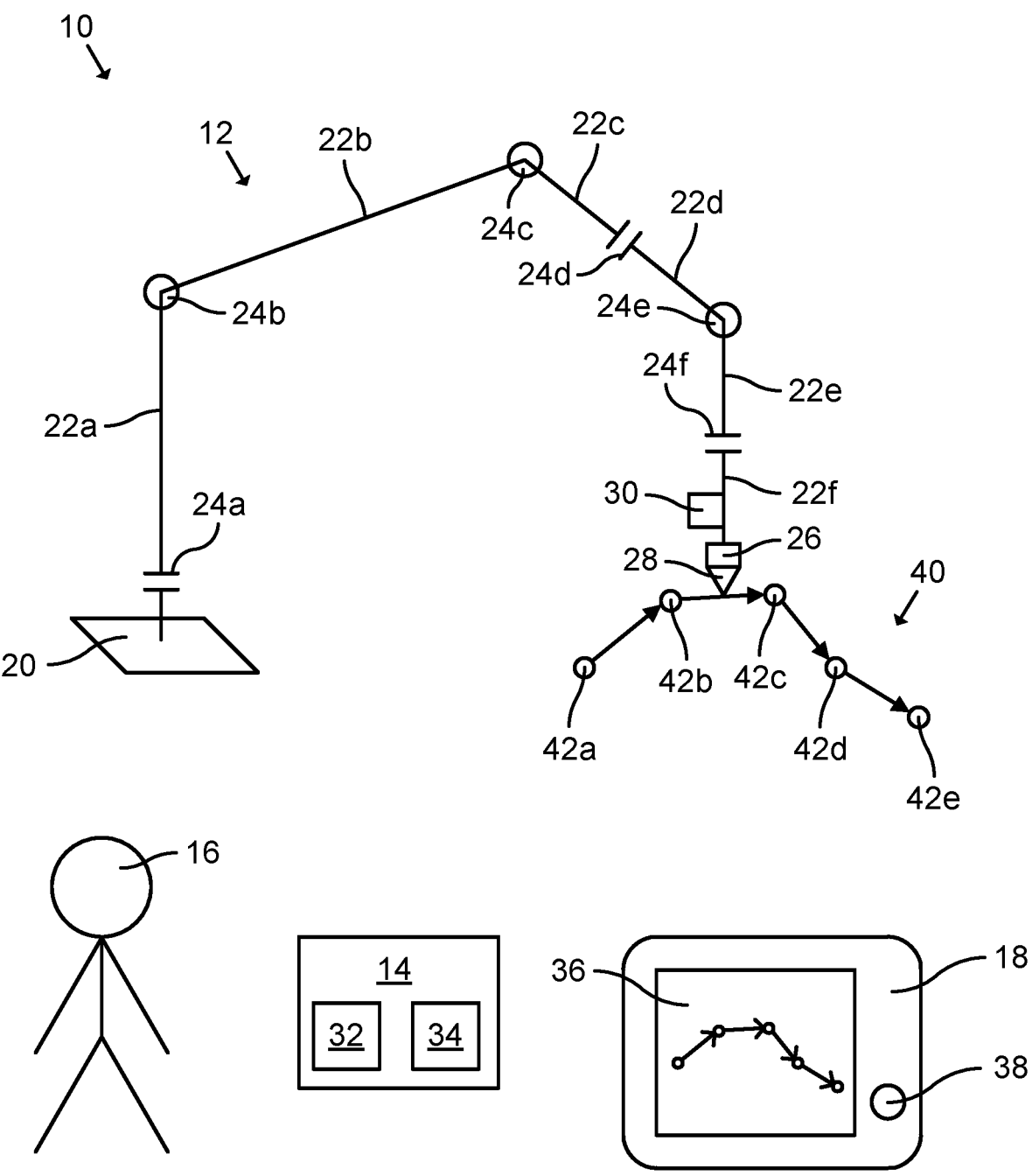
FIG. 1: schematically represents a side view of an industrial robot comprising a manipulator, a control system and a programming device, and a movement path for the manipulator.

In the following, a method of programming a manipulator, a control system for programming a manipulator, and an industrial robot comprising a manipulator and a control system, will be described. The same or similar reference numerals will be used to denote the same or similar structural features.

FIG. 1 schematically represents a side view of an industrial robot 10. The industrial robot 10 comprises a manipulator 12 and a control system 14. The manipulator 12 is here exemplified as a truly collaborative robotic arm. FIG. 1 further shows a human user 16.

The industrial robot 10 of this specific example further comprises a teach pendant unit, TPU, 18. The TPU 18 is one example of a programming device according to the present disclosure. The TPU 18 is optional.

The manipulator 12 of this specific example comprises a base 20, a first link 22*a* rotatable relative to the base 20 at a first axis 24*a*, a second link 22*b* rotatable relative to the first link 22*a* at a second axis 24*b*, a third link 22*c* rotatable relative to the second link 22*b* at a third axis 24*c*, a fourth link 22*d* rotatable relative to the third link 22*c* at a fourth axis 24*d*, a fifth link 22*e* rotatable relative to the fourth link 22*d* at a fifth axis 24*e*, and a sixth link 22*f* rotatable relative to the fifth link 22*e* at a sixth axis 24*f*. One, several or all of the links 22*a*-22*f* may also be referred to with reference numeral "22". One, several or all of the axes 24*a*-24*f* may also be referred to with reference numeral "24".

The manipulator 12 in FIG. 1 is however only one of many examples. The manipulator 12 may for example also comprise one or more translational axes.

The manipulator 12 further comprises a tool 26. The tool 26 is one example of an end effector. The tool 26 comprises a tool center point, TCP, 28. The tool 26 of this example is rigidly connected to the sixth link 22*f*.

The manipulator 12 of this example further comprises a button 30. The button 30 is one example of an input element according to the present disclosure. The button 30 is here arranged on the sixth link 22*f*.

The control system 14 of this example comprises a data processing device 32 and a memory 34. The memory 34 comprises a computer program containing program code, which when executed by the data processing device 32, causes the data processing device 32 to execute, or command execution of, various steps as described herein. The control system 14 is in signal communication with the manipulator 12 and the TPU 18.

The TPU 18 comprises a display 36. The display 36 does however not necessarily need to be provided in the TPU 18. The display 36 may for example alternatively be provided in a personal computer (not shown) or in a mobile phone.

The TPU 18 of this example further comprises a joystick 38. By means of the joystick 38, the manipulator 12 can be jogged to different positions.

FIG. 1 further shows a movement path 40 for execution by the manipulator 12. The movement path 40 comprises a plurality of points 42*a*-42*e*. The movement path 40 of this specific example comprises a first point 42*a*, a second point 42*b*, a third point 42*c*, a fourth point 42*d* and a fifth point 42*e*. The first point 42*a* is a start point and the fifth point 42*e* is an end point. One, several or all of the points 42*a*-42*e* may alternatively be referred to with reference numeral "42".

Figures 2, 3:
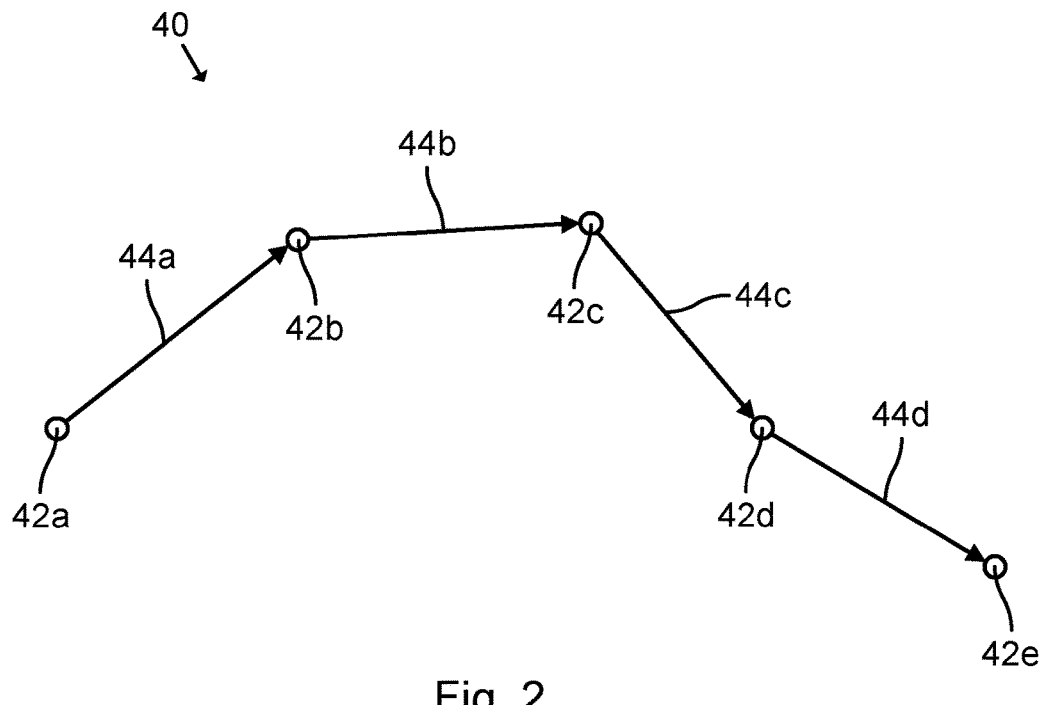
FIG. 2: schematically represents the movement path in FIG. 1.
FIG. 3: schematically represents point selection regions and movement segment selection regions associated with the movement path.

FIG. 2 schematically represents the movement path 40 in FIG. 1. The movement path 40 has in this example been generated by means of interpolation between the points 42*a*-42*e*. In addition to the points 42*a*-42*e*, the movement path 40 further comprises a first movement segment 44*a* interconnecting the first point 42*a* and the second point 42*b*, a second movement segment 44*b* interconnecting the second point 42*b* and the third point 42*c*, a third movement segment 44*c* interconnecting the third point 42*c* and the fourth point 42*d*, and a fourth movement segment 44*d* interconnecting the fourth point 42*d* and the fifth point 42*e*. One, several or all of the movement segments 44*a*-44*d* may alternatively be referred to with reference numeral "44".

The movement segments 44*a*-44*d* are here linear interpolations between the points 42*a*-42*e*. The interpolations may however be of various types, such as spline interpolations.

The points 42*a*-42*e* are target points for the manipulator 12. The manipulator 12 is programmed to move along the movement path 40. In this example, the TCP 28 follows the movement path 40. In some examples, adjacent movement segments 44 may be blended with blending zones and the TCP 28 does then not necessarily pass exactly through the points 42*a*-42*e*.

In each point 42*a*-42*e*, a position for each axis 24 is defined. This means that not only is the TCP 28 being positioned successively in each point 42*a*-42*e* during execution of the movement path 40, but the TCP 28 is positioned with a defined orientation of the TCP 28 and a defined posture of the manipulator 12 in each point 42*a*-42*e*.

FIG. 3 schematically represents point selection regions 46*a*-46*e* and movement segment selection regions 48*a*-48*d* associated with the movement path 40. FIG. 3 shows a first point selection region 46*a* associated with the first point 42*a*, a second point selection region 46*b* associated with the second point 42*b*, a third point selection region 46*c* associated with the third point 42*c*, a fourth point selection region 46*d* associated with the fourth point 42*d*, and a fifth point selection region 46*e* associated with the fifth point 42*e*. One, several or all of the point selection region 46*a*-46*e* may alternatively be referred to with reference numeral "46". Each point selection region 46 is here exemplified as a sphere having the associated point 42 centered therein.

FIG. 3 further shows a first movement segment selection region 48*a* associated with the first movement segment 44*a*, a second movement segment selection region 48*b* associated with the second movement segment 44*b*, a third movement segment selection region 48*c* associated with the third movement segment 44*c*, and a fourth movement segment selection region 48*d* associated with the fourth movement segment 44*d*. One, several or all of the movement segment selection regions 48*a*-48*d* may alternatively be referred to with reference numeral "48". Each movement segment selection region 48 here has a substantially cylindrical shape with the associated movement segment 44 centered therein.

The point selection regions 46 and the movement segment selection regions 48 are used to facilitate selection of points 42 and movement segments 44, respectively, as described herein. As shown in FIG. 3, the point selection regions 46 and the movement segment selection regions 48 are mutually exclusive in a continuous volume reachable by the manipulator 12. Thus, the point selection regions 46 and the movement segment selection regions 48 are not overlapping each other.

Figures 4A, 4B:
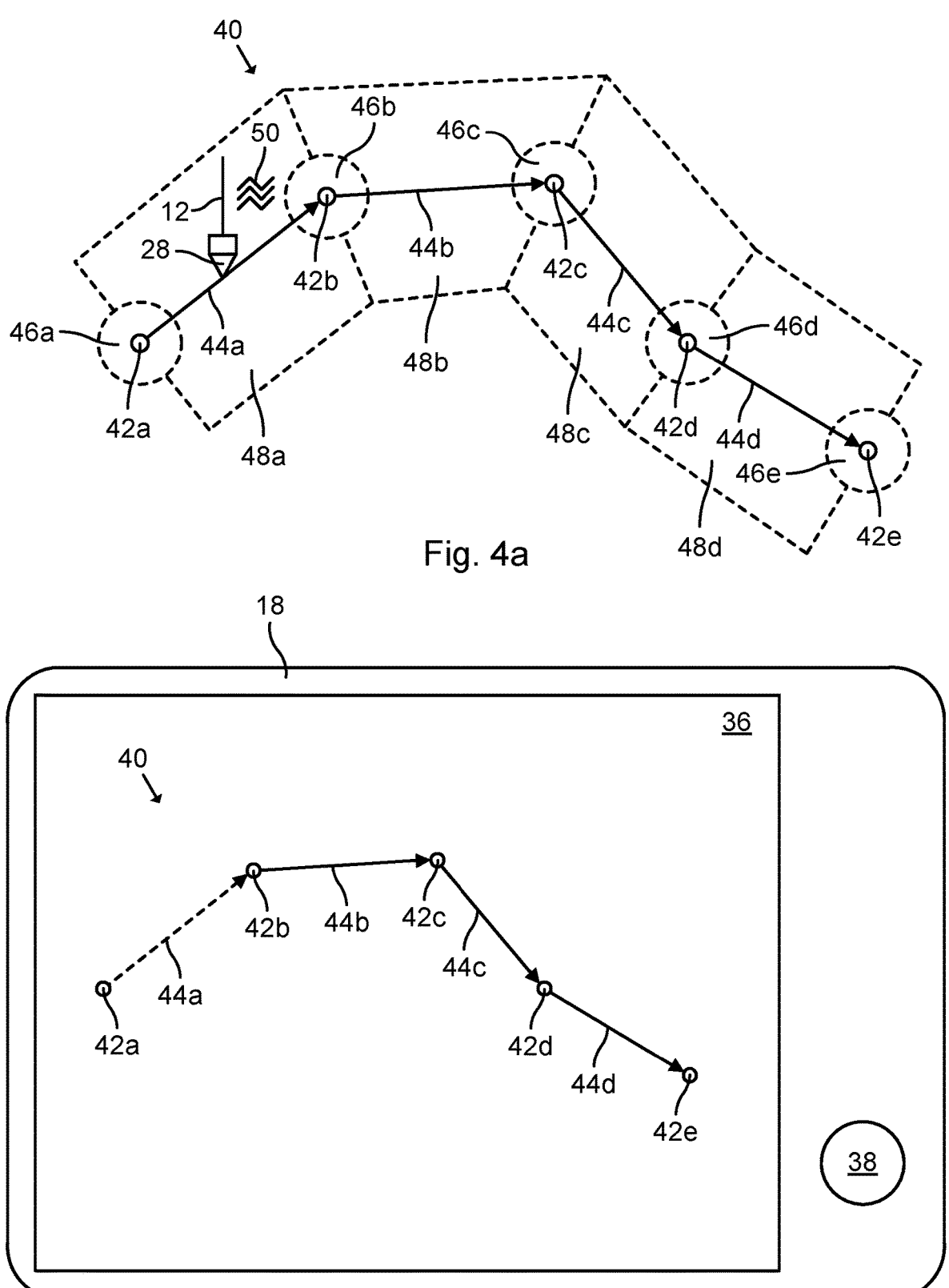
FIG. 4*a*: schematically represents movement of the manipulator along the movement path.
FIG. 4*b*: schematically represents a display of the programing device during the situation of the manipulator in FIG. 4*a*.

FIG. 4*a* schematically represents movement of the manipulator 12 along the movement path 40, and FIG. 4*b* schematically represents the display 36 during the situation of the manipulator 12 in FIG. 4*a*. With collective reference to FIGS. 4*a* and 4*b*, the manipulator 12 is in a lead-through mode. The manipulator 12 is thereby controlled with a reduced stiffness (or controlled to be "floating") such that the user 16 can manually move the manipulator 12, e.g. by grabbing and pushing the manipulator 12. In FIGS. 4*a* and 4*b*, a robot program for the manipulator 12 comprising the movement path 40 already exists. The robot program is implemented in the control system 14.

During movement of the manipulator 12, the control system 14 continuously determines the position of the TCP 28 to understand where in the robot program the manipulator 12 is positioned. It is however not essential for the method that the positions of the TCP 28 are determined. As one alternative, the positions of the axes 24 may be read instead.

The manipulator 12 here moves along the first movement segment 44*a*. During the movement, the manipulator 12 is forced towards the closest movement segment 44 by means of force feedback 50. When the TCP 28 is on the first movement segment 44*a*, the force of the force feedback 50 is zero. Should the TCP 28 be moved laterally out from the first movement segment 44*a*, a restoring force of the force feedback 50 increases with an increasing distance between the TCP 28 and the first movement segment 44*a*. The force feedback 50 thereby functions as a lane assist for the manipulator 12 causing the TCP 28 to snap to the movement path 40. The restoring force may increase for increasing deviations between the TCP 28 and the first movement segment 44*a*. The user 16 will feel this restoring force in the manipulator 12 when moving the manipulator 12. The user 16 is thereby assisted by the force feedback 50 to accurately guide the TCP 28 along the movement path 40. The force feedback 50 thereby indicates that the manipulator 12 is in one of the movement segment selection regions 48 provided that the force feedback 50 is actuated only when the manipulator 12 is in one of the movement segment selection regions 48, and not when the manipulator 12 is outside of the movement segment selection regions 48.

As shown in FIG. 4*b*, a graphical representation of the movement path 40 is displayed on the display 36. When the control system 14 determines that the TCP 28 is inside the first movement segment selection region 48*a*, the first movement segment 44*a* is visually highlighted on the display 36. The user 16 is thereby made aware that the first movement segment 44*a* is eligible for selection, as described herein. As shown in FIG. 4*b*, the first movement segment 44*a* is represented by a dashed line while the remaining movement segments 44*b*-44*d* are represented by solid lines. The dashed line is thus a further example of a feedback to the user 16 indicating that the TCP 28 is in the first movement segment selection region 48*a*.

Figures 5A, 5B:
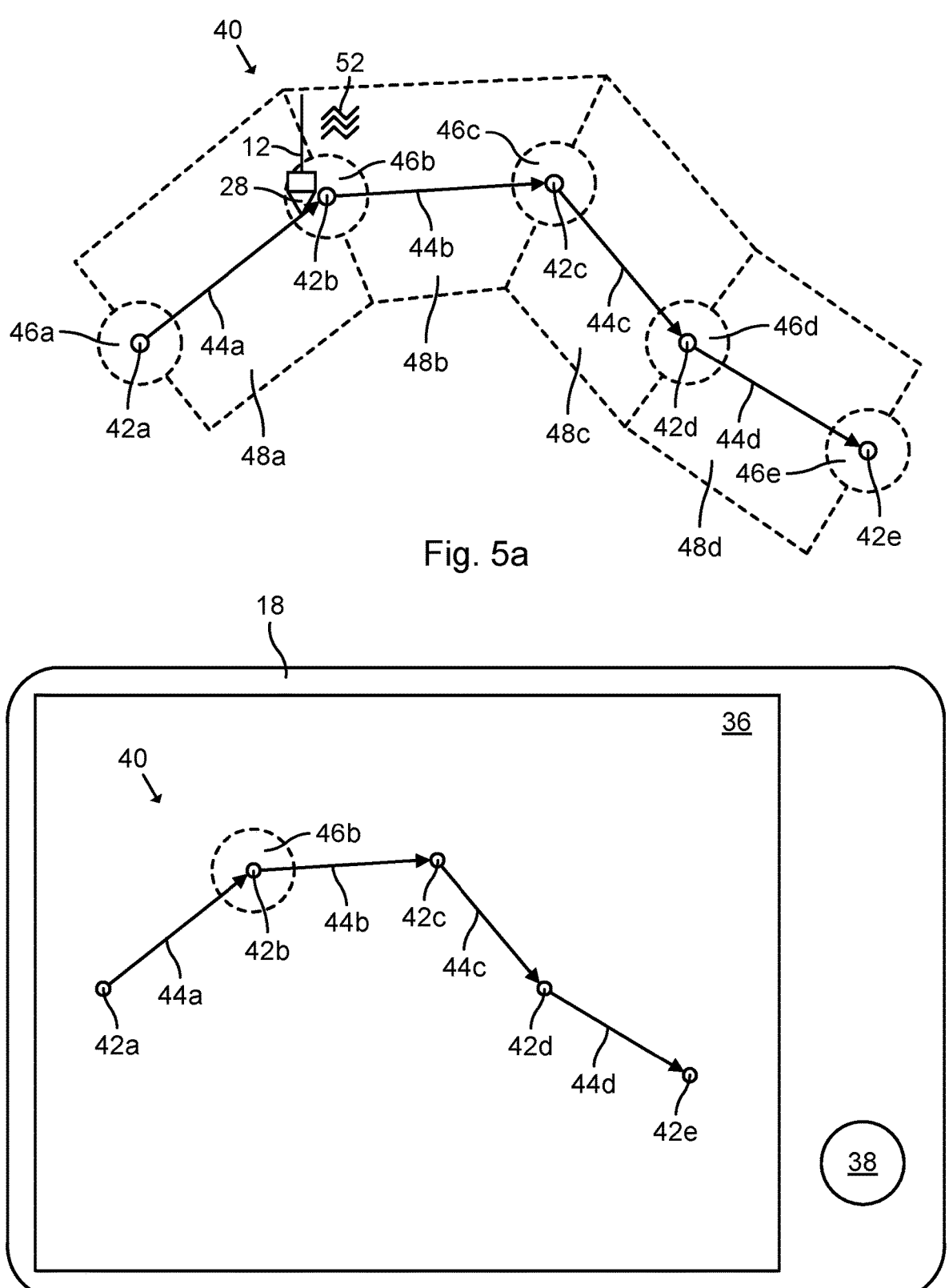
FIG. 5*a*: schematically represents further movement of the manipulator along the movement path.
FIG. 5*b*: schematically represents the display during the situation of the manipulator in FIG. 5*a*.

FIG. 5*a* schematically represents further movement of the manipulator 12 along the movement path 40, and FIG. 5*b* schematically represents the display 36 during the situation of the manipulator 12 in FIG. 5*a*. With collective reference to FIGS. 5*a* and 5*b*, the TCP 28 is now inside the second point selection region 46*b*. The second point 42*b* is thereby triggered for being selected by the user 16.

The manipulator 12 generates vibrations 52 to inform the user 16 that the TCP 28 has entered the second point selection region 46*b*. The user 16 is thereby notified that the TCP 28 is close to the second point 42b. The vibrations 52 may also be issued when the TCP 28 exits the second point selection region 46b. The vibrations 52 constitute a further example of a force feedback according to the present disclosure. The vibrations 52 provide feedback to the user 16 indicative of the manipulator 12 being in one of the point selection regions 46. The force feedback 50 may be continued to be issued when the TCP 28 has entered any of the point selection regions 46.

As an alternative or a complement to the force feedback 50 and 52, visual feedback and/or audible feedback may be used. For example, a light emitter may be provided on the manipulator 12 to issue light of a first color when the TCP 28 is inside one of the movement segment selection regions 48 and to issue a light of a second color, different from the first color, when the TCP 28 is inside one of the point selection regions 46.

As shown in FIG. 5b, the second point selection region 46b is represented by a circle while the remaining point selection regions 46a and 46c-46e are not displayed. The display of the second point selection region 46b is thus a further example of a feedback indicating to the user 16 that the TCP 28 is in the second point selection region 46b and close to the second point 42b.

Figures 6A, 6B:
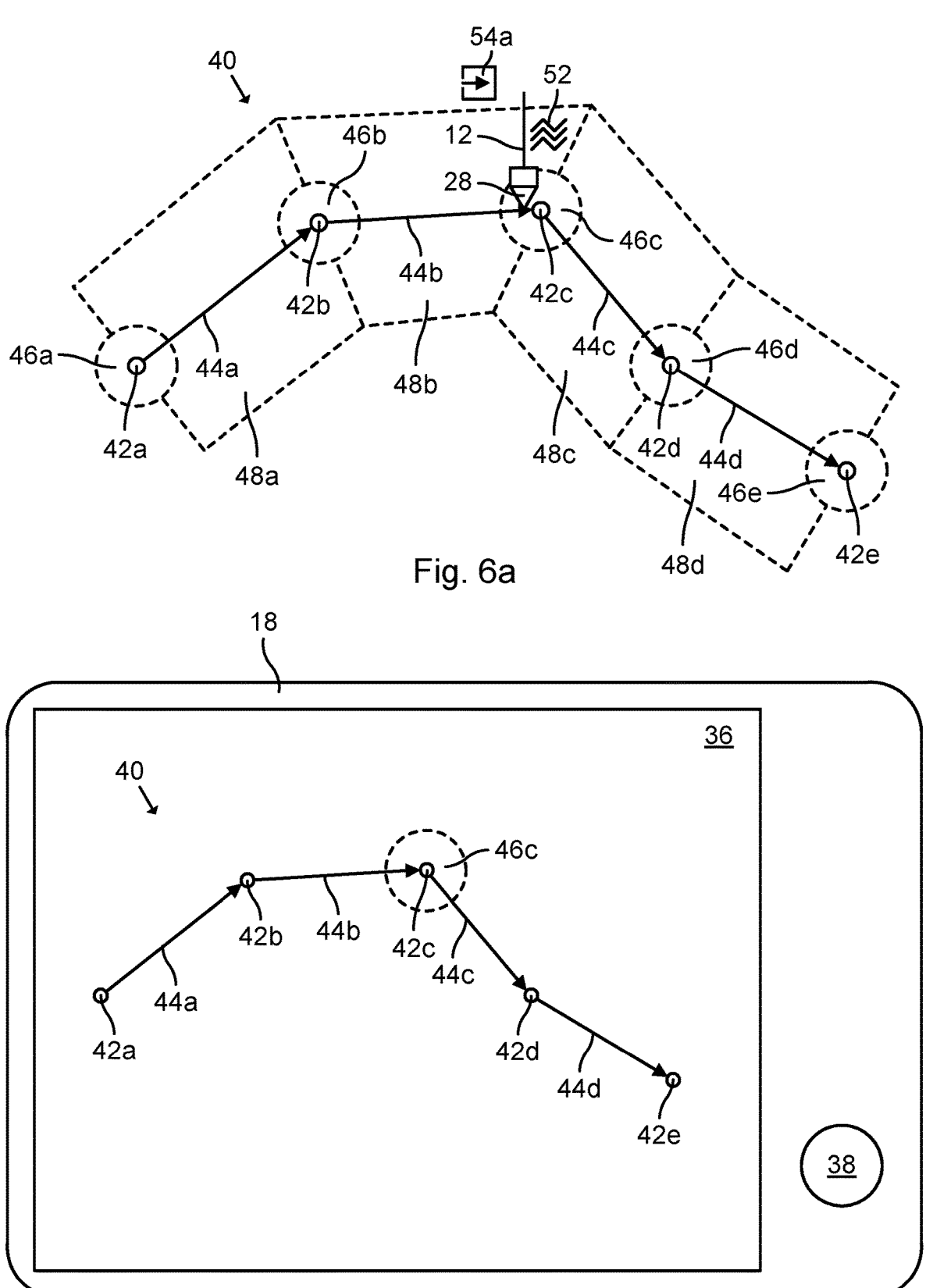
FIG. 6*a*: schematically represents further movement of the manipulator along the movement path and one example of a selection input.
FIG. 6*b*: schematically represents the display during the situation of the manipulator in FIG. 6*a*.

FIG. 6a schematically represents further movement of the manipulator 12 along the movement path 40, and FIG. 6b schematically represents the display 36 during the situation of the manipulator 12 in FIG. 6a. In the following, one example of modifying one of the points 42 of the movement path 40 will be described.

With collective reference to FIGS. 6a and 6b, the TCP 28 is now inside the third point selection region 46c. The manipulator 12 has generated vibrations 52 to inform the user 16 that the TCP 28 has entered the third point selection region 46c. In addition, the third point selection region 46c is highlighted on the display 36 to indicate to the user 16 that the TCP 28 is close to the third point 42c. The third point 42c is now triggered for being selected by the user 16.

When the TCP 28 is inside the third point selection region 46c, the user 16 provides a selection input 54a. The selection input 54a of this example is a push and hold operation of the button 30 by the user 16. The third point 42c is now selected for modification. Upon receiving the selection input 54a when the TCP 28 is in the third point selection region 46c, the control system 14 selects the third point 42c for modification and enters a point modification mode. The position of the TCP 28 can thus be used as a basis for selecting one of the points 42a-42e to be modified.

Figures 7A, 7B:
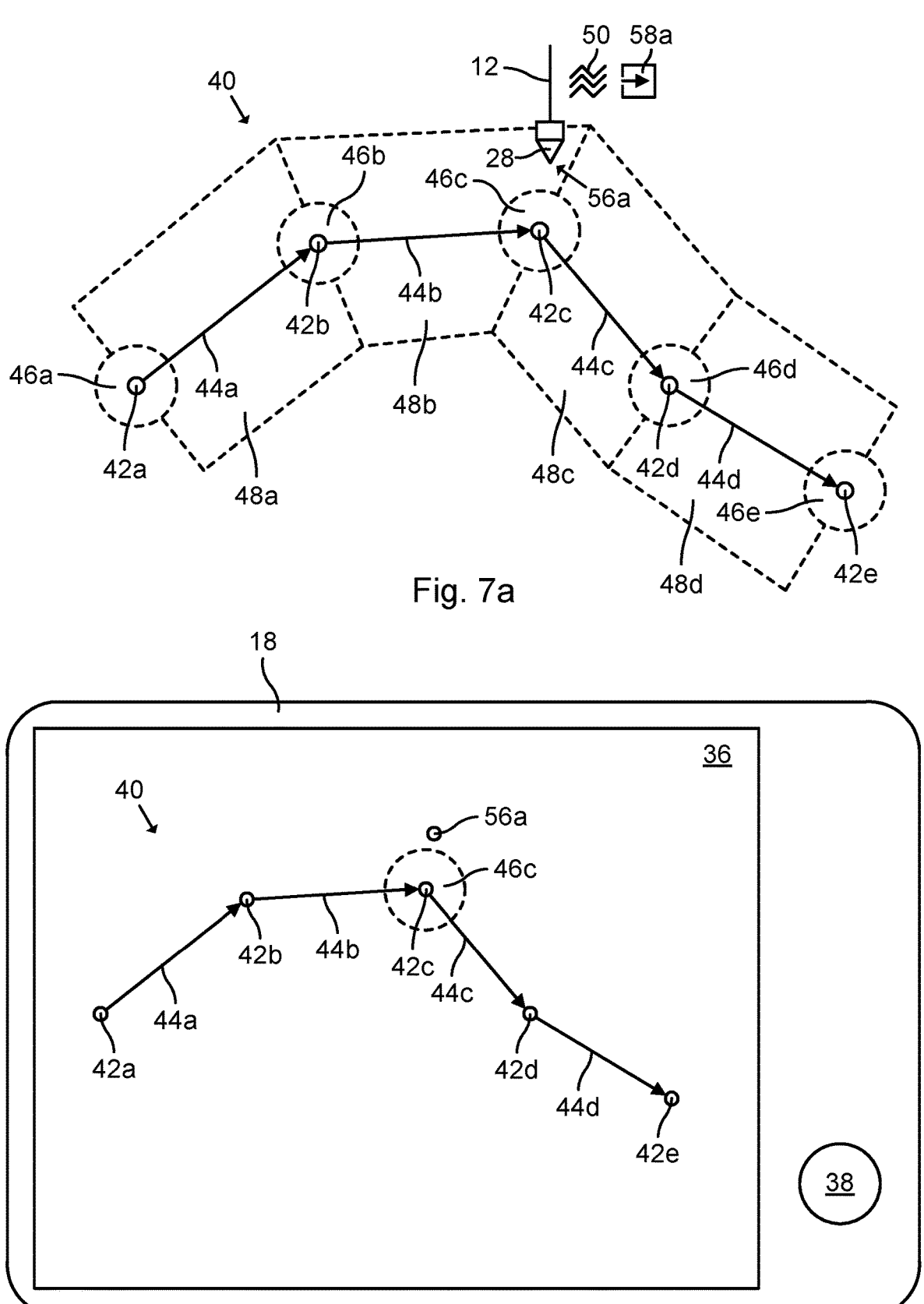
FIG. 7*a*: schematically represents movement of the manipulator to a path modifying position and one example of a modification input.
FIG. 7*b*: schematically represents the display during the situation of the manipulator in FIG. 7*a*.

FIG. 7a schematically represents movement of the manipulator 12 in the point modification mode, and FIG. 7b schematically represents the display 36 during the situation of the manipulator 12 in FIG. 7a. With collective reference to FIGS. 7a and 7b, the TCP 28 has been moved by the user 16 to a path modifying position 56a by lead-through. The path modifying position 56a is here a position of the TCP 28 to which the third point 42c will be moved. The path modifying position 56a may be either inside or outside the movement segment selection regions 48. In this example, the path modifying position 56a is inside the second movement segment selection region 48b.

As shown in FIG. 7b, the path modifying position 56a is continuously displayed on the display 36 in relation to the movement path 40. The user 16 can thereby easily understand how the third point 42c will be moved in relation to the movement path 40.

The restoring force of the force feedback 50 towards the movement path 40 is increased as the TCP 28 moves away from the movement path 40. The user 16 thereby becomes aware of that the TCP 28 is outside the movement path 40. A maximum force of the force feedback 50 may however be limited such that the user 16 is not physically prevented from moving the TCP 28 to the desired position.

When the user 16 is satisfied with the movement of the third point 42c, the user 16 provides a modification input 58a. The modification input 58a of this example is a release of the button 30 by the user 16. The user 16 can thereby push and hold the button 30 to select a point 42 for modification and release the button 30 at a desired location to which the point 42 should be moved. This constitutes one example of modifying the movement path 40 from the first point 42a to the fifth point 42e based on a path modifying position 56a upon receiving a modification input 58a from the user 16.

The method enables a particularly user friendly programming of the manipulator 12 when using lead-through programming. Although this example is a method of programming the manipulator 12 by using lead-through programming, the principles of the method are also applicable with other ways to move the manipulator 12, such as by means of the joystick 38.

Figure 8:
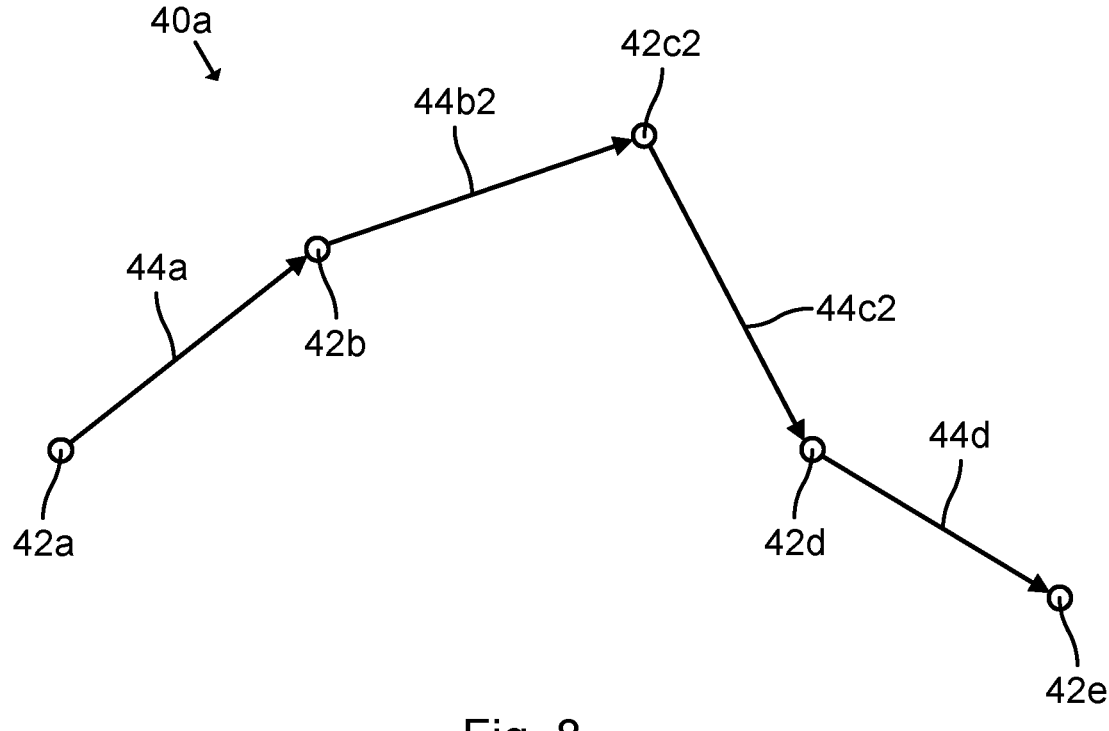
FIG. 8: schematically represents one example of a modified movement path.

FIG. 8 schematically represents one example of a modified movement path 40a. When the user 16 has provided the modification input 58a in the point modification mode, the movement path 40 is modified to provide the movement path 40a. Instead of the third point 42c, the movement path 40a comprises a secondary third point 42c2. The secondary third point 42c2 corresponds to the position of the TCP 28 when the modification input 58a is provided by the user 16. Thus, instead of adding a sixth point at the end of the sequence of points 42a-42e, the third point 42c is moved to the position of the secondary third point 42c2.

The third point 42c can be modified without having to provide any inputs to the TPU 18. The user 16 can thereby modify the movement path 40 without removing the hands from the manipulator 12. Although the TPU 18 is optional for modifying the movement path 40, the user 16 may look at the display 36 of the TPU 18 if needed to more fully understand which programming events are taking place.

After modification of the third point 42c, the control system 14 automatically generates a secondary second movement segment 44b2 interconnecting the second point 42b and the secondary third point 42c2, and a secondary third movement segment 44c2 interconnecting the secondary third point 42c2 and the fourth point 42d. The robot program may then be updated by replacing the movement path 40 with the modified movement path 40a. The modified movement path 40a may then be executed by the manipulator 12.

Figures 9A, 9B:
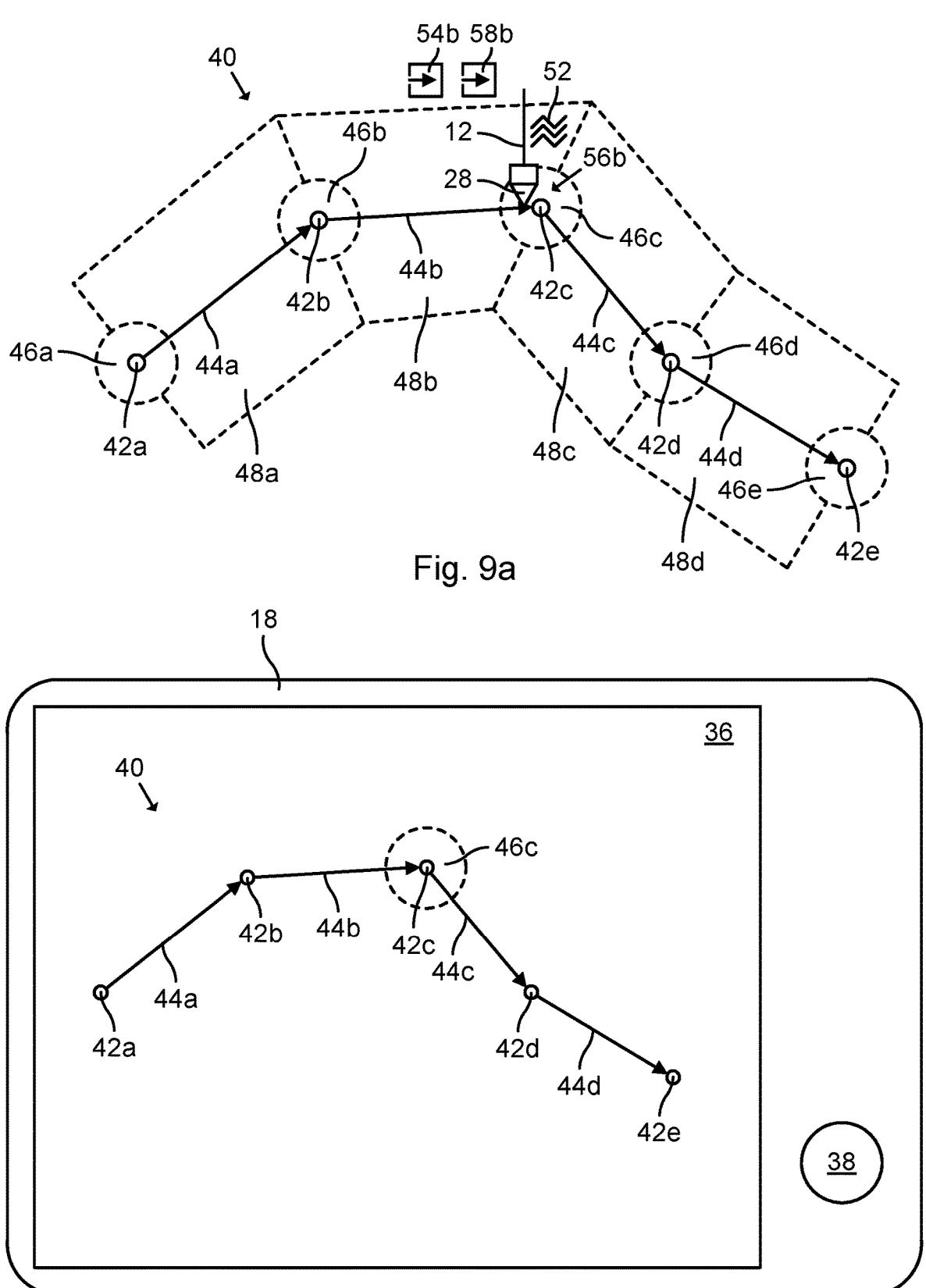
FIG. 9*a*: schematically represents movement of the manipulator along the movement path, a further example of a selection input and a further example of a modification input.
FIG. 9*b*: schematically represents the display during the situation of the manipulator in FIG. 9*a*.

FIG. 9a schematically represents movement of the manipulator 12 along the movement path 40, and FIG. 9b schematically represents the display 36 during the situation of the manipulator 12 in FIG. 9a. In FIG. 9a, the TCP 28 is in the same position as in FIG. 6a. In the following, one example of deleting one of the points 42 from the movement path 40 will be described.

With collective reference to FIGS. 9a and 9b, the TCP 28 is now in a path modifying position 56b inside the third point selection region 46c. The third point selection region 46c is highlighted on the display 36 to indicate that the TCP 28 is close to the third point 42c. The third point 42c is thereby triggered for being selected by the user 16.

When the TCP 28 is in inside the third point selection region 46c, the user 16 now provides a selection input 54b and a subsequent modification input 58b while the TCP 28 is positioned in the path modifying position 56b inside the third point selection region 46c. The selection input 54b of this example is a first push of the button 30 and the modification input 58b of this example is a second push of the button 30 in the same position of the TCP 28 as when providing the selection input 54b.

The position of the TCP 28 can thus also be used as a basis for selecting one of the points 42a-42e to be deleted. Upon receiving the modification input 58b, the control system 14 deletes the third point 42c from the movement path 40. This constitutes a further example of modifying the movement path 40 from the first point 42a to the fifth point 42e based on a path modifying position 56b upon receiving a modification input 58b from the user 16.

As one of many alternatives of inputs from the user 16 to delete a point 42, the selection input 54b may be a push and hold operation of the button 30 and the modification input 58b may be a release of the button 30 in the same position of the TCP 28 as when providing the selection input 54b. Thus, in some variants, the only difference in inputs from the user 16 between modifying a point 42 and deleting a point 42 is whether or not the manipulator 12 is moved between pushing the button 30 and releasing the button 30.

Figure 10:
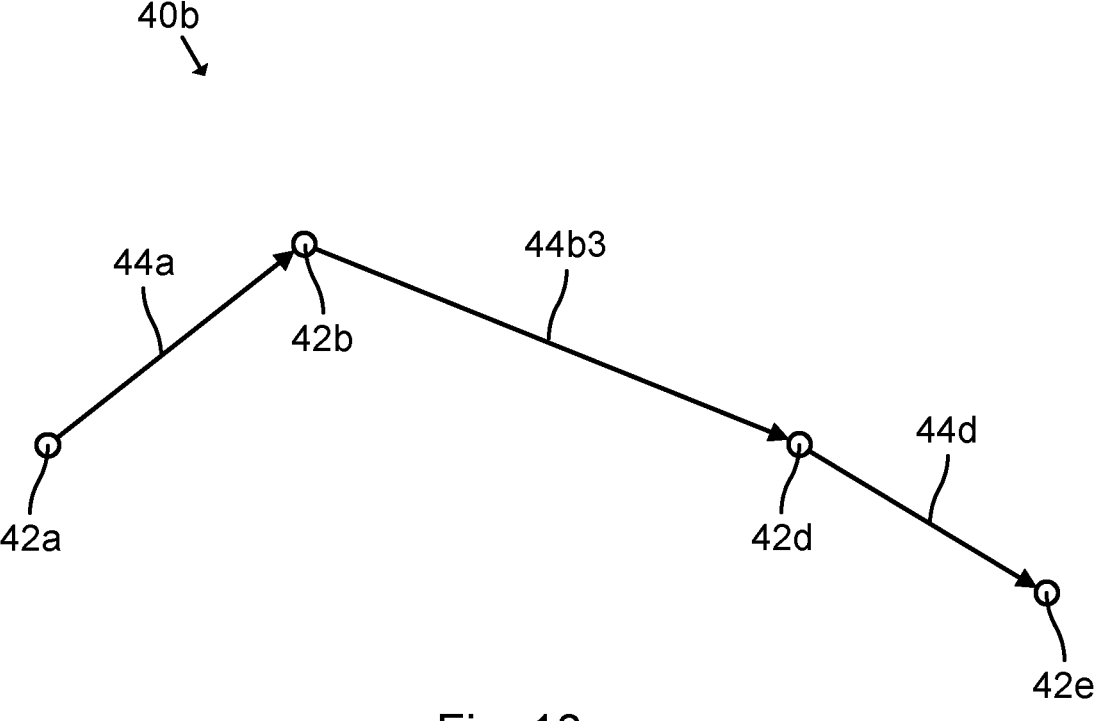
FIG. 10: schematically represents a further example of a modified movement path.

FIG. 10 schematically represents a further example of a modified movement path 40b. When the user 16 has provided the modification input 58b, the movement path 40 is modified to provide the movement path 40b. In contrast to the movement path 40, the movement path 40b does not comprise the third point 42c. The third point 42c can be deleted without having to provide any inputs to the TPU 18. Also in this way, the user 16 can thereby modify the movement path 40 without removing the hands from the manipulator 12.

After deletion of the third point 42c, the control system 14 automatically generates a secondary second movement segment 44b3 interconnecting the second point 42b and the fourth point 42d. The robot program may then be updated by replacing the movement path 40 with the modified movement path 40b. The modified movement path 40b may then be executed by the manipulator 12.

Figures 11A, 11B:
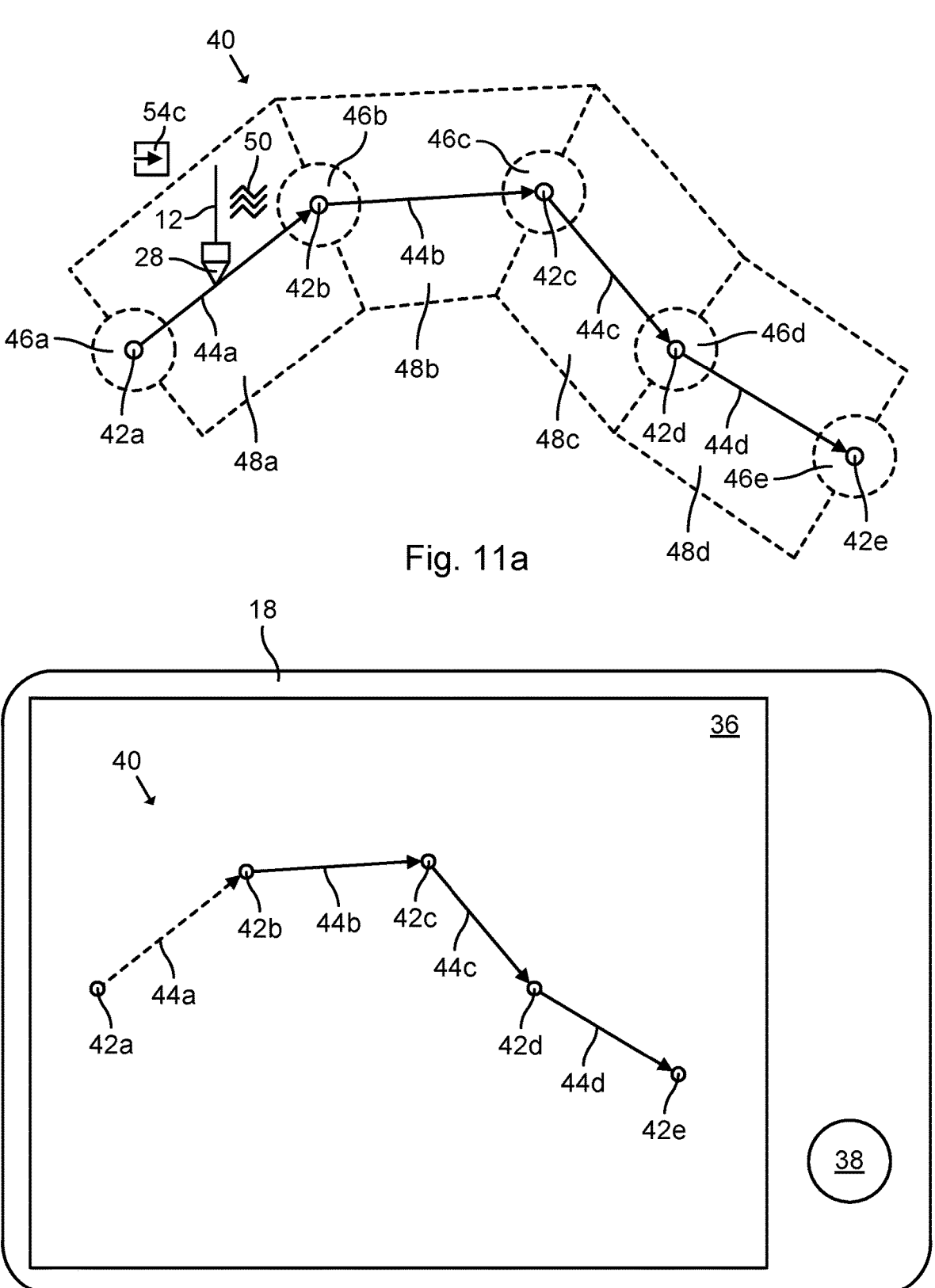
FIG. 11*a*: schematically represents movement of the manipulator along the movement path.
FIG. 11*b*: schematically represents the display during the situation of the manipulator in FIG. 11*a*.

FIG. 11a schematically represents movement of the manipulator 12 along the movement path 40, and FIG. 11b schematically represents the display 36 during the situation of the manipulator 12 in FIG. 11a. In the following, one example of adding a point 42 to the movement path 40 will be described.

With collective reference to FIGS. 11a and 11b, the TCP 28 is now inside the first movement segment selection region 48a. The first movement segment 44a is highlighted on the display 36 to indicate that the TCP 28 is in the first movement segment selection region 48a. The first movement segment 44a is thereby triggered for being selected by the user 16.

When the TCP 28 is inside the first movement segment selection region 48a, the user 16 provides a selection input 54c. Similarly to the modification of a point 42, the selection input 54c for adding a point 42 is in this specific example a push and hold operation of the button 30 by the user 16. Upon receiving the selection input 54c when the TCP 28 is in the first movement segment selection region 48a, the control system 14 selects the first movement segment 44a for modification by adding a further point 42 in association with the first movement segment 44a and enters a point addition mode. The position of the TCP 28 can thus also be used as a basis for selecting one of the movement segments 44 to be modified by adding a further point 42 in association with the movement segment 44.

Since the point modification mode is entered when receiving the selection input 54a when the TCP 28 is in a point selection region 46, the point addition mode is entered when receiving the selection input 54c when the TCP 28 is in a movement segment selection region 48, and since the selection inputs 54a and 54c may be identical, the point selection regions 46 and the movement segment selection regions 48 constitute examples of modification type selection positions according to the present disclosure. Thus, a path modification type among point modification and point addition can be selected purely based on the position of the manipulator 12 when receiving the selection input 54a and 54c.

Figures 12A, 12B:
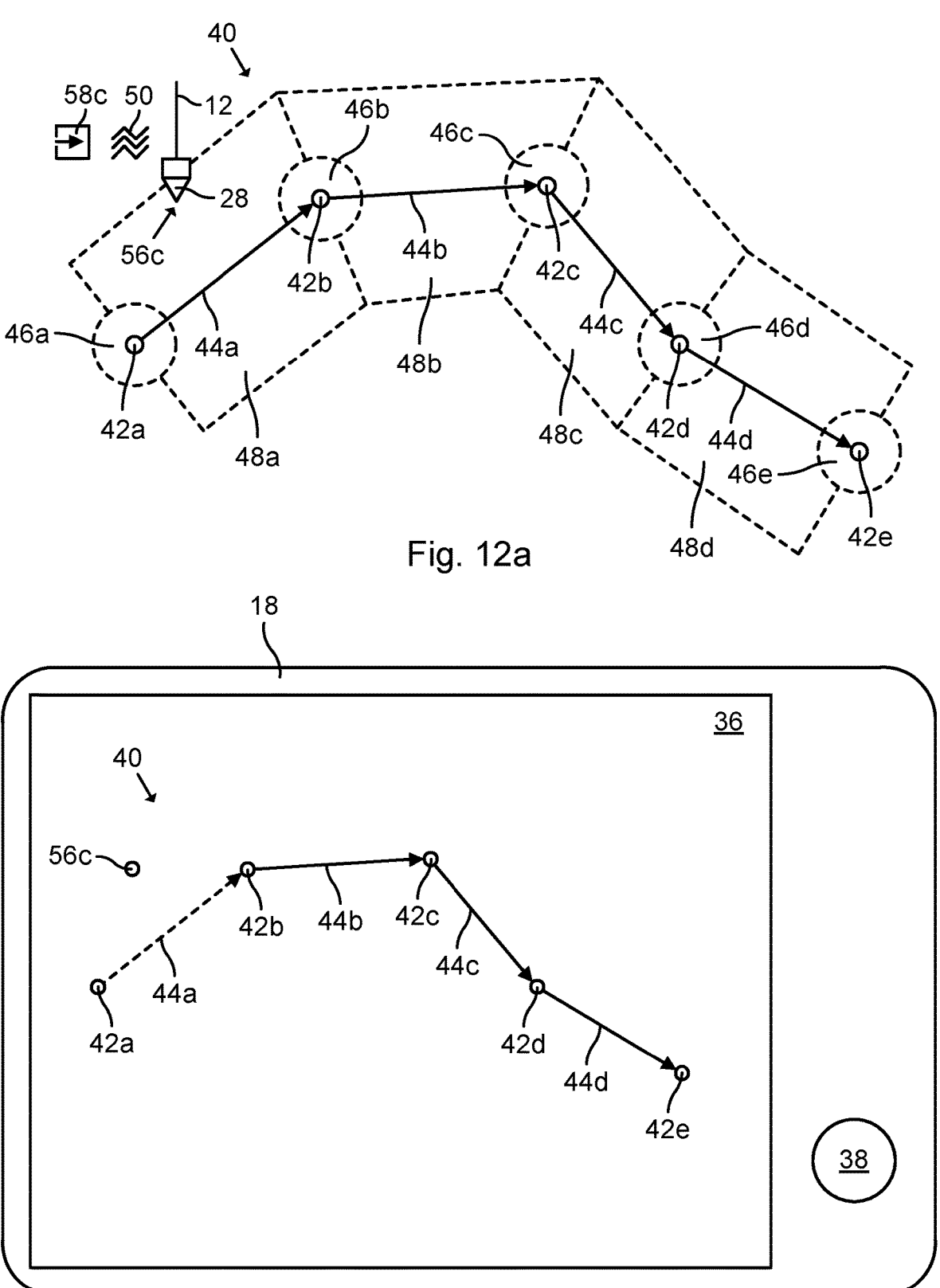
FIG. 12*a*: schematically represents movement of the manipulator to a further example of a path modifying position and a further example of a modification input.
FIG. 12*b*: schematically represents the display during the situation of the manipulator in FIG. 12*a*.

FIG. 12a schematically represents movement of the manipulator 12 in the point addition mode, and FIG. 12b schematically represents the display 36 during the situation of the manipulator 12 in FIG. 12a. With collective reference to FIGS. 12a and 12b, the TCP 28 has been moved by the user 16 to a path modifying position 56c by lead-through. The path modifying position 56c is here a position of the TCP 28 where a new point 42 will be added.

As shown in FIG. 12b, the path modifying position 56c is continuously displayed on the display 36 in relation to the movement path 40. The user 16 can thereby easily understand where the new point 42 will be added in relation to the movement path 40.

The force from the force feedback 50 towards the movement path 40 is increased as the TCP 28 moves away from the movement path 40. The user 16 thereby becomes aware of that the TCP 28 is outside the movement path 40.

When the user 16 is satisfied with the path modifying position 56c where the new point 42 will be added, the user 16 provides a modification input 58c. The modification input 58c of this example is a release of the button 30 by the user 16. The user 16 can thereby push and hold the button 30 to select a movement segment 44 for modification by addition of a further point 42 and release the button 30 at a desired location where the new point 42 should be added. This constitutes a further example of modifying the movement path 40 from the first point 42a to the fifth point 42e based on a path modifying position 56c upon receiving a modification input 58c from the user 16. Also this variant enables a particularly user friendly programming of the manipulator 12 when using lead-through programming, but also a highly user friendly programming when moving the manipulator 12 in other ways than with lead-through.

Figure 13:
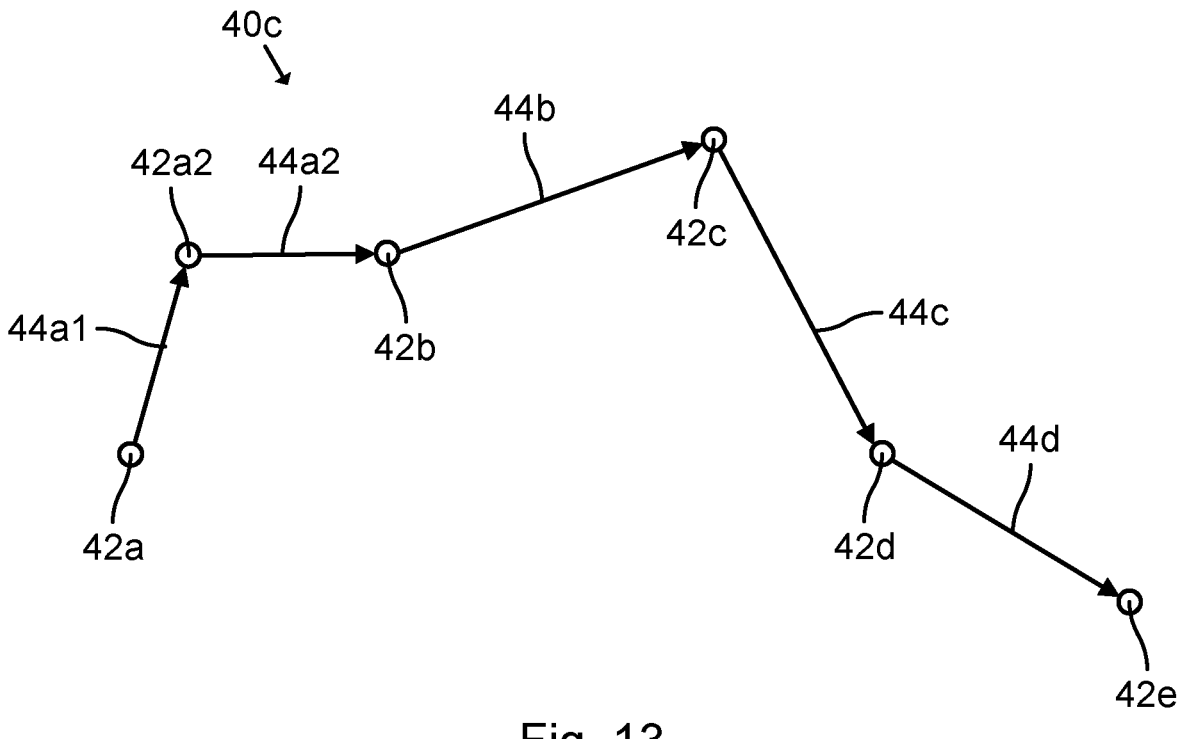
FIG. 13: schematically represents a further example of a modified movement path.

FIG. 13 schematically represents a further example of a modified movement path 40c. When the user 16 has provided the modification input 58c in the point addition mode, the movement path 40 is modified to provide the movement path 40c. The movement path 40c differs from the movement path 40 by additionally comprising a secondary first point 42a2 between the first point 42a and the second point 42b. The secondary first point 42a2 can be added without having to provide any inputs to the TPU 18. Also in this way, the user 16 can thereby modify the movement path 40 without removing the hands from the manipulator 12.

After addition of the secondary first point 42a2, the control system 14 automatically generates a primary first movement segment 44a1 interconnecting the first point 42a and the secondary first point 42a2, and a secondary first movement segment 44a2 interconnecting the secondary first point 42a2 and the second point 42b. The primary first movement segment 44a1 and the secondary first movement segment 44a2 of the movement path 40c replace the first movement segment 44a of the movement path 40. The robot program may then be updated by replacing the movement path 40 with the modified movement path 40*c*. The modified movement path 40*c* may then be executed by the manipulator 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of programming a manipulator, the method comprising:

providing a movement path for execution by the manipulator, the movement path comprising a plurality of points including a start point and an end point and at least one movement segment between the plurality of points;

moving the manipulator to a modification type selection position;

selecting at least one path modification type, among a plurality of path modification types, for modification of the movement path based on the modification type selection position;

moving the manipulator to a path modifying position; and modifying the movement path from the start point to the end point based on the at least one selected path modification type and the path modifying position upon receiving a modification input from a user.

2. The method according to claim 1, wherein the modification of the movement path comprises modifying one of the points, deleting one of the points or adding a further point.

3. The method according to claim 2, wherein the modification or the deletion of the point comprises:

moving the manipulator to a point selection region among a plurality of point selection regions, each point selection region being associated with a unique point among the plurality of points;

selecting the point associated with the point selection region to which the manipulator has been moved as the point for modification or deletion; and modifying or deleting the selected point based on the path modifying position.

4. The method according to claim 3, further comprising providing feedback to the user indicative of the manipulator being in one of the point selection regions.

5. The method according to claim 4, wherein the feedback comprises a force feedback in the manipulator.

6. The method according to claim 4, wherein the point selection regions and at least one movement segment selection region are mutually exclusive in a continuous volume reachable by the manipulator.

7. The method according to claim 3, wherein the selection of the point associated with the point selection region or the selection of the movement segment associated with the movement segment selection region is made based on a selection input from the user.

8. The method according to claim 3, wherein the point selection regions and at least one movement segment selection region are mutually exclusive in a continuous volume reachable by the manipulator.

9. The method according to claim 8, wherein the at least one movement segment selection region and a plurality of point selection regions are mutually exclusive in a continuous volume reachable by the manipulator.

10. The method according to claim 2, wherein the addition of the further point comprises:

moving the manipulator to a movement segment selection region among at least one movement segment selection region, each movement segment selection region being associated with a unique movement segment among the at least one movement segment;

selecting the movement segment associated with the movement segment selection region to which the manipulator has been moved as a movement segment for modification; and adding the further point in association with the selected movement segment based on the path modifying position.

11. The method according to claim 10, wherein the point selection regions and the at least one movement segment selection region are mutually exclusive.

12. The method according to claim 10, further comprising providing feedback to the user indicative of the manipulator being in one of the at least one movement segment selection region.

13. The method according to claim 1, wherein the movement of the manipulator comprises moving the manipulator by means of lead-through.

14. The method according to claim 13, further comprising providing force feedback towards the movement path during movement of the manipulator.

15. A control system for programming a manipulator, the control system comprising at least one data processing device and at least one memory having at least one computer program stored thereon, the at least one computer program having program code which, when executed by the at least one data processing device, causes the at least one data processing device to perform the steps of:

providing a movement path for execution by the manipulator, the movement path having a plurality of points including a start point and an end point and at least one movement segment between the plurality of points;

continuously or repeatedly reading a position of the manipulator;

selecting at least one path modification type, among a plurality of path modification types, for modification of the movement path based on a modification type selection position of the manipulator;

continuously or repeatedly determining a path modifying position based on a current position of the manipulator; and modifying the movement path from the start point to the end point based on the at least one selected path modification type and the path modifying position upon receiving a modification input from a user.

16. An industrial robot comprising a manipulator and a control system for programming the manipulator, the control system including at least one data processing device and at least one memory having at least one computer program stored thereon, the at least one computer program having program code which, when executed by the at least one data processing device, causes the at least one data processing device to perform the steps of:

providing a movement path for execution by the manipulator, the movement path having a plurality of points including a start point and an end point and at least one movement segment between the plurality of points;

continuously or repeatedly reading a position of the manipulator;

selecting at least one path modification type, among a plurality of path modification types, for modification of the movement path based on a modification type selection position of the manipulator;

continuously or repeatedly determining a path modifying position based on a current position of the manipulator; and modifying the movement path from the start point to the end point based on the at least one selected path modification type and the path modifying position upon receiving a modification input from a user.

17. The industrial robot according to claim 16, further comprising an input element on the manipulator for providing the modification input.

\* \* \* \* \*